United States Patent [19]

Koyama et al.

[11] Patent Number: 5,183,585
[45] Date of Patent: Feb. 2, 1993

[54] LIQUID CRYSTAL EMULSION COMPOSITION

[75] Inventors: Toshiya Koyama; Yukio Matsumoto, both of Ichihara; Hataaki Yoshimoto, Chiba; Katsuhiro Ito, Ichihara, all of Japan

[73] Assignee: Ube Industries, Ltd., Japan

[21] Appl. No.: 705,567

[22] Filed: May 24, 1991

[30] Foreign Application Priority Data

May 25, 1990 [JP] Japan .................. 2-134114

[51] Int. Cl.⁵ .................. C09K 19/52; C09K 19/00
[52] U.S. Cl. .................. 252/299.01; 252/299.1; 252/299.5; 428/1
[58] Field of Search ............ 252/299.01, 299.1, 299.5; 428/1; 359/58

[56] References Cited

U.S. PATENT DOCUMENTS

| | | | |
|---|---|---|---|
| 4,605,284 | 8/1986 | Fergason | 359/98 |
| 4,673,255 | 6/1987 | West et al. | 359/51 |
| 4,992,201 | 2/1991 | Pearlman | 252/299.1 |
| 5,066,105 | 1/1991 | Yoshimoto et al. | 359/58 |
| 5,093,735 | 3/1992 | Doane et al. | 252/299.01 |
| 5,119,218 | 6/1992 | Yoshimoto et al. | 359/54 |
| 5,128,785 | 7/1992 | Yoshimoto et al. | 359/58 |

FOREIGN PATENT DOCUMENTS 60-252687 12/1985 Japan .
WO83/01016 3/1983 World Int. Prop. O. .

Primary Examiner—Robert L. Stoll
Assistant Examiner—Shean C. Wu
Attorney, Agent, or Firm—Finnegan, Henderson, Farabow, Garrett & Dunner

[57] ABSTRACT

A liquid crystal emulsion composition usable for forming a polymer dispersed type liquid crystal membrane free from undesirable bubbles, by a printing method, comprises 100 parts by weight of a liquid crystal material, 10 to 100 parts by weight of a saponification product of a polyvinyl acetate resin, 1 to 30 parts by weight of an aliphatic alcohol having 3 to 8 carbon atoms and 50 to 1,000 parts by weight of water.

5 Claims, No Drawings

LIQUID CRYSTAL EMULSION COMPOSITION

BACKGROUND OF THE INVENTION

1) Field of the Invention

The present invention relates to a liquid crystal emulsion composition usable for providing a polymer dispersed type liquid crystal composite membrane through which a transmission of light can be controlled to a target value.

2) Description of the Related Art

Recently, a new type of liquid crystal composite membrane has been developed by utilizing a polymer dispersed type liquid crystal material, and this new type of liquid crystal composite membrane is useful as a film-shaped light shutter having a large area, or as a display means having a large area.

Where a polymer dispersed type liquid crystal layer prepared from a liquid crystal material having a positive dielectric anisotropy and a polymeric matrix having a refractive index substantially equal to an ordinary refractive index of the liquid crystal material is interposed between a pair of electrode plates, the resultant liquid crystal device can scatter rays of light irradiated thereon when an electric field is not applied thereto, and can allow a transmission of the light therethrough when the electric field is applied thereto.

Among various polymer dispersed types of liquid crystal materials, PCT International Publication No. WO 83/01016 discloses a Nematic Curvilinear Aligned Phase (NCAP) liquid crystal material; PCT Japanese Unexamined Patent Publication No. 60-252687 discloses a latex-entrapped liquid crystal material; PCT Japanese Publication No. 61-502128 discloses fine droplets of a liquid crystal material dispersed in an epoxy resin matrix, and Polymer Preprintings, Japan, Vol. 37, No. 8, 2450(1988) discloses a liquid crystal material composite membrane in which a liquid crystal material is formed into a network structure by a solvent casting method.

The formation of the polymer dispersed type liquid crystal composite membrane on a surface of a base plate can be carried out by (1) coating a surface of a base plate with a liquid crystal emulsion with a doctor blade coater or roll coater, and then drying the resultant coated liquid crystal emulsion layer on the base plate, or (2) interposing a layer comprising a mixture of a liquid crystal material with a prepolymer, between a pair of base plates, and then curing the resultant interposed mixture layer by a heating or light-irradiation procedure.

The above-mentioned methods are appropriate when forming a non-patterned polymer dispersed type liquid crystal composite membrane on a whole area of the base plate surface, but are disadvantageous in that, where a polymer dispersed type liquid crystal composite membrane must have a certain pattern, unnecessary portions of the non-patterned liquid crystal composite membrane must be removed in accordance with the required pattern.

If a printing method can be applied, the patterned liquid crystal composite membrane will be easily formed in accordance with the required pattern, on the base plate surface, and the removal of the portions of the liquid crystal composite membrane, which is not economical, can be avoided.

Nevertheless, when a conventional liquid crystal emulsion is printed in accordance with a required pattern, on a base plate surface, the resultant polymer dispersed type liquid crystal composite membrane is disadvantageous in that a number of bubbles are formed in the layer, and thus the smoothness of the resultant membrane surface is unsatisfactory.

SUMMARY OF THE INVENTION

An object of the present invention is to provide a liquid crystal emulsion composition which is printable and useful for forming a polymer-dispersed type liquid crystal composite membrane in which no bubbles are formed.

Another object of the present invention is to provide a liquid crystal emulsion composition useful for forming a polymer dispersed type liquid crystal composite membrane having an enhanced surface smoothness.

The above-mentioned objects can be attained by the liquid crystal emulsion composition of the present invention, which comprises 100 parts by weight of a liquid crystal material; 10 to 100 parts by weight of a saponification product of a polyvinyl acetate resin; 1 to 30 parts by weight of at least one aliphatic alcohol having 3 to 8 carbon atoms; and 50 to 1,000 parts by weight of water.

The liquid crystal emulsion composition of the present invention optionally comprises 0.01 to 10 parts by weight of a pleochroic dye, per 100 parts by weight of the liquid crystal material.

DESCRIPTION OF THE PREFERRED EMBODIMENTS

In the liquid crystal emulsion composition, the liquid crystal material comprises at least one member selected from the group consisting of nematic liquid crystal materials, cholesteric liquid crystal material and smectic liquid crystal materials.

The saponification product of the polyvinyl acetate resin usable for the present invention, referred to as polyvinyl alcohol hereinafter, is soluble in water and preferably has a degree of polymerization of 100 to 10,000, more preferably 200 to 3000, and a degree of saponification of 50% to 100%, more preferably 60 to 90%.

The polyvinyl alcohol resin is present in a content of 10 to 100 parts by weight per 100 parts by weight of the liquid crystal material, and the polyvinyl alcohol resin forms a transparent polymer matrix in which the liquid crystal material is dispersed. If the content of the polyvinyl alcohol in the emulsion composition is less than 10 parts, the resultant liquid crystal composite membrane exhibits an unsatisfactory stability. Also, if the content of the polyvinyl alcohol is more than 100 parts by weight, the resultant liquid crystal composite membrane exhibits an unsatisfactory contrast ratio.

The polyvinyl alcohol resin can be dissolved in water or in an aqueous solution of an aliphatic alcohol having 3 to 8 carbon atoms.

The aliphatic alcohol usable for the present invention has 3 to 8 carbon atoms, and is present in an amount of 1 to 30 parts by weight per 100 parts by weight of the liquid crystal material.

In the liquid crystal emulsion composition, a portion of the specific aliphatic alcohol is dissolved in the liquid crystal phase and the other portion of the aliphatic alcohol is dissolved together with the polyvinyl alcohol resin in a water phase.

The specific aliphatic alcohol is advantageous in that the aliphatic alcohol accelerates the emulsification of the liquid crystal material in the polyvinyl alcohol aqueous solution; promotes the removal of bubbles or foam formed in the liquid crystal emulsion composition during the emulsifying operation; or introduced into the printed or coated liquid crystal emulsion composition layer during the printing, especially screen printing operation or coating operation.

Further, the specific aliphatic alcohol effectively enhances the surface smoothness of the resultant liquid crystal composite membrane.

If the content of the specific aliphatic alcohol is less than 1 part the resultant polymer dispersed type liquid crystal composite membrane contains bubbles or pores formed therein and/or has an unsatisfactory surface smoothness.

If the specific aliphatic alcohol is employed in an amount of more than 30 parts, it is difficult to smoothly coat or print the resultant liquid crystal emulsion on the base plate surface.

The aliphatic alcohol is preferably selected from the group consisting of n-butyl alcohol, n-pentylalcohol, isobutyl alcohol, tert-butyl alcohol, isopropyl alcohol, hexyl alcohol, 2-butyl alcohol and isoamyl alcohol.

If an aliphatic alcohol having 2 or less carbon atoms is employed, the resultant liquid crystal emulsion composition exhibits an unsatisfactory bubble-removing effect and emulsification-promoting effect.

Also, if an aliphatic alcohol having 9 or more carbon atoms is used, the resultant liquid crystal emulsion composition exhibits an unsatisfactory bubble-removing effect and is difficult to be dried by evaporation.

Among the above-mentioned aliphatic alcohols having 3 to 8 carbon atoms, n-butyl alcohol and n-pentyl alcohol are especially preferable for the present invention because, when a liquid crystal emulsion composition containing these aliphatic alcohols is printed and dried in accordance with a desired pattern on a base plate surface, the resultant dried polymer dispersed type liquid crystal composite membrane substantially does not contain the aliphatic alcohol, and even if a portion of the above-mentioned aliphatic alcohol remains, the resultant liquid crystal composite membrane is not adversely influenced by the remaining aliphatic alcohol.

Also, the liquid crystal emulsion composition of the present invention can provide a specific polymer dispersed type liquid crystal composite membrane having a better voltage-luminance relationship than that of another polymer dispersed type liquid crystal composite membrane formed from a conventional liquid crystal emulsion composition.

The liquid crystal emulsion composition of the present invention can be converted to a corresponding polymer dispersed type liquid crystal composite membrane by, for example, the following method.

A liquid crystal material is mixed with predetermined amounts of the polyvinyl alcohol, the specific aliphatic alcohol, and water, at room temperature, to provide an emulsion composition. The resultant liquid crystal emulsion composition is coated by a coater, for example, doctor blade coater or roll coater, or printed by a screen printing method, on a base plate surface, and the resultant emulsion composition layer is dried to provide a polymer dispersed type liquid crystal composite membrane.

Optionally, the liquid crystal emulsion composition of the present invention further comprises 0.01 to 10 parts by weight of a pleochroic dye selected from, for example, anthraquinone type or azo type pleochroic dyes, per 100 parts by weight of the liquid crystal material.

The pleochroic dye added to the liquid crystal emulsion composition effectively enhances the contrast ratio.

EXAMPLES

The present invention will be further illustrated by means of the following examples.

EXAMPLE 1

A liquid crystal emulsion composition was prepared by stirring a mixture of 10 g of a liquid crystal material available under the trademark of LIQUID CRYSTAL E-44 from Merck Japan Co. and containing 2% by weight of a pleochroic black dye available under the trademark of S-344 from Mitsui Toatsu Senryo K.K., 20 g of an aqueous solution containing 15% by weight of polyvinyl alcohol resin available under the trademark of GOSENOL KM-11, from Nihon Gosei Kagaku Kogyo K.K., and 3 g of n-butyl alcohol, at a rotation speed of 800 rpm for 8 minutes to emulsify the mixture.

The resultant liquid crystal emulsion composition was printed through a 180 mesh printing screen in accordance with a predetermined pattern on a glass base plate coated with ITO and the printed emulsion composition layer was dried to provide a polymer ispersed type liquid crystal composite membrane having a thickness of 15 μm. This composite membrane was free from bubbles and pores and had a smooth surface.

The liquid crystal composite membrane was interposed between a pair of ITO base plates and the side edges of the resultant laminate were sealed by an adhesive, to provide a display panel.

The resultant panel was arranged at a location 20 cm from a light source (fluorescent lamp) of 15,000 nit and voltages of 30 to 100 volts were applied to the panel. The luminance of the panel (amount of light transmitted through the polymer dispersed liquid crystal material layer) was measured by a luminance meter.

The results of the measurement are shown in Table 1.

COMPARATIVE EXAMPLE 1

The same procedures as in Example 1 were carried out except that, in the preparation of the liquid crystal emulsion composition, n-butyl alcohol was not added.

It was found that, when the liquid crystal emulsion composition was printed on the ITO-coated glass base plate surface through the 180 mesh printing screen, a number of air bubbles were formed in the resultant liquid crystal emulsion composition layer.

Accordingly, the liquid crystal emulsion composition was coated on the ITO-coated glass base plate by using a doctor blade coater, to provide a polymer-dispersed type liquid crystal composite membrane having a thickness of 15 μm.

This liquid crystal composite membrane was subjected to the provision of the same type of display panel as in Example 1, and the resultant panel was subjected to the same measurement of the voltage-luminance relationship as in Example 1.

The results are shown in Table 1.

TABLE 1

| Item | Luminance (nit) under voltage of: | | | | |
| --- | --- | --- | --- | --- | --- |
| Example No. | 0 volt | 30 volts | 50 volts | 70 volts | 100 volts |
| Example 1 | 41 | 52 | 520 | 2500 | 4160 |
| Comparative | 50 | 190 | 1090 | 1950 | 3080 |

TABLE 1-continued

| Item | Luminance (nit) under voltage of: | | | | |
|---|---|---|---|---|---|
| Example No. | 0 volt | 30 volts | 50 volts | 70 volts | 100 volts |
| Example 1 | | | | | |

Table 1 clearly shows that the light transmission through the liquid crystal composite membrane prepared from the liquid crystal emulsion composition of the present invention is significantly increased under a high voltage.

Also it was confirmed that the liquid crystal emulsion composition of the present invention can form a polymer dispersed type liquid crystal composite membrane by a printing method, especially a screen printing method, without forming bubbles therein.

We claim:

1. A liquid crystal emulsion composition for forming a polymer dispersed type liquid crystal composite membrane, comprising 100 parts by weight of a liquid crystal material;

10 to 100 parts by weight of a saponification product of a polyvinyl acetate resin;

1 to 30 parts by weight of at least one aliphatic alcohol having 3 to 8 carbon atoms; and 50 to 1,000 parts by weight of water.

2. The liquid crystal emulsion composition as claimed in claim 1, which further comprises 0.01 to 10 parts of a pleochroic dye.

3. The liquid crystal emulsion composition as claimed in claim 1, wherein the liquid crystal material comprises at least one member selected from the group consisting of nematic liquid crystal materials, cholesteric liquid crystal materials, and smectic liquid crystal materials.

4. The liquid crystal emulsion composition as claimed in claim 1, wherein the saponification product of the polyvinyl acetate resin has a degree of polymerization of 100 to 10,000 and a degree of saponification of 50 to 100%.

5. The liquid crystal emulsion composition as claimed in claim 1, wherein the aliphatic alcohol is selected from the group consisting of n-butyl alcohol, n-pentyl alcohol, isobutyl alcohol, tert-butyl alcohol, isopropyl alcohol, hexyl alcohol, 2-butyl alcohol, and isoamyl alcohol.

* * * * *